(12) United States Patent
Lin

(10) Patent No.: US 11,458,663 B2
(45) Date of Patent: *Oct. 4, 2022

(54) INTELLIGENT AUTOMATIC MOLD-EXCHANGING METHOD

(71) Applicant: CHUNG CHWAN ENTERPRISE CO., LTD., Taoyuan (TW)

(72) Inventor: Yu-Pau Lin, Taoyuan (TW)

(73) Assignee: ZHONG CHUAN TECHNOLOGY LIMITED, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,665

(22) Filed: Feb. 19, 2021

(65) Prior Publication Data
US 2021/0170648 A1 Jun. 10, 2021

Related U.S. Application Data

(62) Division of application No. 16/706,914, filed on Dec. 9, 2019, now Pat. No. 11,312,050.

(30) Foreign Application Priority Data

Aug. 20, 2019 (TW) ................................ 108129575

(51) Int. Cl.
*B29C 45/17* (2006.01)
*B65G 47/90* (2006.01)

(52) U.S. Cl.
CPC ........ *B29C 45/1756* (2013.01); *B65G 47/905* (2013.01)

(58) Field of Classification Search
CPC .............. B29C 45/1756; B65G 47/905; H01L 21/67769
See application file for complete search history.

(56) References Cited

U.S. PATENT DOCUMENTS

2011/0091589 A1* 4/2011 Yamamoto .......... B29C 45/1756
425/63
2020/0316675 A1* 10/2020 Salas-Loranca .......... B22C 9/02

FOREIGN PATENT DOCUMENTS

| CN | 104384358 A | 3/2015 |
|---|---|---|
| CN | 109773055 A | 5/2019 |

(Continued)

*Primary Examiner* — Saul Rodriguez
*Assistant Examiner* — Brendan P Tighe
(74) *Attorney, Agent, or Firm* — Li & Cai Intellectual Property (USA) Office

(57) ABSTRACT

An intelligent automatic mold-exchanging system and an intelligent automatic mold-exchanging method are provided. The system include a mold storage unit, a mold assembly and disassembly unit, a mold temporary storage unit, a temporary storage mold pick-and-place unit, a plurality of processing machines, a plurality of mold position preparation units, an exchange mold pick-and-place unit, and a central control unit. The central control unit is electrically connected to the mold storage unit, the mold assembly and disassembly unit, the mold temporary storage unit, the temporary storage mold pick-and-place unit, the processing machines, the mold position preparation units, and the exchange mold pick-and-place unit. The mold storage unit, the mold assembly and disassembly unit, the mold temporary storage unit, the temporary storage mold pick-and-place unit, the processing machines, the mold position preparation units, and the exchange mold pick-and-place unit are disposed on a same production line.

10 Claims, 14 Drawing Sheets

(56) References Cited

FOREIGN PATENT DOCUMENTS

| EP | 0246398 A2 | 11/1987 | | |
|---|---|---|---|---|
| JP | 62290511 A | 12/1987 | | |
| JP | 2002219725 A | 8/2002 | | |
| JP | 2007118111 A | 5/2007 | | |
| JP | 2010639 A | 1/2010 | | |
| KR | 1020190009802 A | 1/2019 | | |
| WO | WO-2017199091 A1 * | 11/2017 | ............. | B22C 23/00 |

* cited by examiner

INTELLIGENT AUTOMATIC MOLD-EXCHANGING METHOD

CROSS-REFERENCE TO RELATED APPLICATION

This application is a divisional application of Ser. No. 16/706,914 filed on Dec. 9, 2019, and entitled "INTELLIGENT AUTOMATIC MOLD-EXCHANGING SYSTEM AND METHOD", the entire disclosures of which are incorporated herein by reference.

FIELD OF THE DISCLOSURE

The present disclosure relates to a mold-exchanging technical field, and more particularly to an intelligent automatic mold-exchanging method.

BACKGROUND OF THE DISCLOSURE

Since the First Industrial Revolution of the 18th century, a large quantity of machines and factories has replaced humans and animals for manufacturing products.

In a modern industrial production process, although machines and factories have replaced humans and animals as primary sources for productivity, manpower is still used for transporting materials and molds. As a result, an efficiency of the production process cannot be optimized, and labor costs cannot be reduced.

SUMMARY OF THE DISCLOSURE

In response to the above-referenced technical inadequacies, the present disclosure provides an intelligent automatic mold-exchanging method.

In one aspect, the present disclosure provides an intelligent automatic mold-exchanging system which includes a mold storage unit, a mold assembly and disassembly unit, a mold temporary storage unit, a temporary storage mold pick-and-place unit, a plurality of processing machines, a plurality of mold position preparation units, an exchange mold pick-and-place unit, and a central control unit. The mold storage unit includes a plurality of reserve molds disposed therein. The mold assembly and disassembly unit is adjacent to the mold storage unit. The mold temporary storage unit is adjacent to the mold assembly and disassembly unit. The temporary storage mold pick-and-place unit is movably disposed above the mold temporary storage unit. The processing machines are adjacent to the mold temporary storage unit, and each processing machine includes a raw processing mold. The mold position preparation units are respectively disposed beside the processing machines. The exchange mold pick-and-place unit is movably disposed above the processing machines and the mold position preparation units. The central control unit is electrically connected to the mold storage unit, the mold assembly and disassembly unit, the mold temporary storage unit, the temporary storage mold pick-and-place unit, the processing machines, the mold position preparation units, and the exchange mold pick-and-place unit. The mold storage unit, the mold assembly and disassembly unit, the mold temporary storage unit, the temporary storage mold pick-and-place unit, the processing machines, the mold position preparation units, and the exchange mold pick-and-place unit are disposed on a same production line.

In another aspect, the present disclosure provides an intelligent automatic mold-exchanging method. The method includes the following steps: transferring a reserve mold to a mold temporary storage unit; transferring the reserve mold that has been placed in the mold temporary storage unit to a mold position preparation unit by an exchange mold pick-and-place unit, wherein the mold position preparation unit is disposed beside a processing machine; picking out a raw processing mold disposed in the processing machine, and placing the raw processing mold in the mold position preparation unit by the exchange mold pick-and-place unit; placing the reserve mold that has been disposed in the mold position preparation unit in the processing machine by the exchange mold pick-and-place unit; and transferring the raw processing mold that has been placed in the mold position preparation unit to the mold temporary storage unit by the exchange mold pick-and-place unit.

One of the beneficial effects of the present disclosure is that the intelligent automatic mold-exchanging system can improve an efficiency of a transporting process and reduce a time of the process by the technical features of "the mold storage unit including the reserve molds disposed therein", "the mold assembly and disassembly unit being adjacent to the mold storage unit", "the mold temporary storage unit being adjacent to the mold assembly and disassembly unit", "the temporary storage mold pick-and-place unit being movably disposed above the mold temporary storage unit", "the processing machines being adjacent to the mold temporary storage unit, wherein each processing machine includes a raw processing mold", "the mold position preparation units being respectively disposed beside the processing machines", "the exchange mold pick-and-place unit being movably disposed above the processing machines and the mold position preparation units", "the central control unit being electrically connected to the mold storage unit, the mold assembly and disassembly unit, the mold temporary storage unit, the temporary storage mold pick-and-place unit, the processing machines, the mold position preparation units, and the exchange mold pick-and-place unit", and "the mold storage unit, the mold assembly and disassembly unit, the mold temporary storage unit, the temporary storage mold pick-and-place unit, the processing machines, the mold position preparation units, and the exchange mold pick-and-place unit being disposed on the same production line".

Another beneficial effect of the present disclosure is that the intelligent automatic mold-exchanging method can improve an efficiency of a mold-exchanging process and reduce a time of the process by the technical solutions of "transferring a reserve mold to a mold temporary storage unit", "transferring the reserve mold that has been placed in the mold temporary storage unit to a mold position preparation unit by an exchange mold pick-and-place unit", "picking out a raw processing mold disposed in the processing machine, and placing the raw processing mold in the mold position preparation unit by the exchange mold pick-and-place unit", "placing the reserve mold that has been disposed in the mold position preparation unit in the processing machine by the exchange mold pick-and-place unit", and "transferring the raw processing mold that has been placed in the mold position preparation unit to the mold temporary storage unit by the exchange mold pick-and-place unit".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
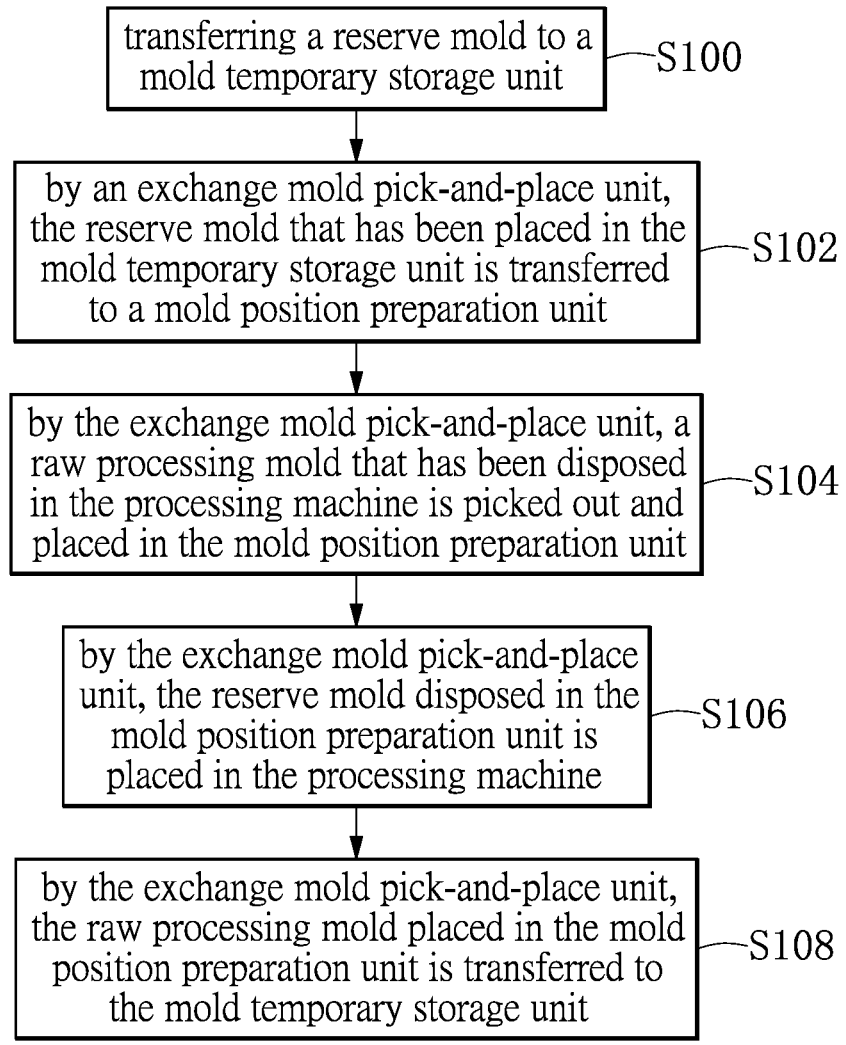
FIG. 1 is a flow chart of an intelligent automatic mold-exchanging method according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIGS. 1 to 10, a first embodiment of the present disclosure provides an intelligent automatic mold-exchanging method.

Figure 3:
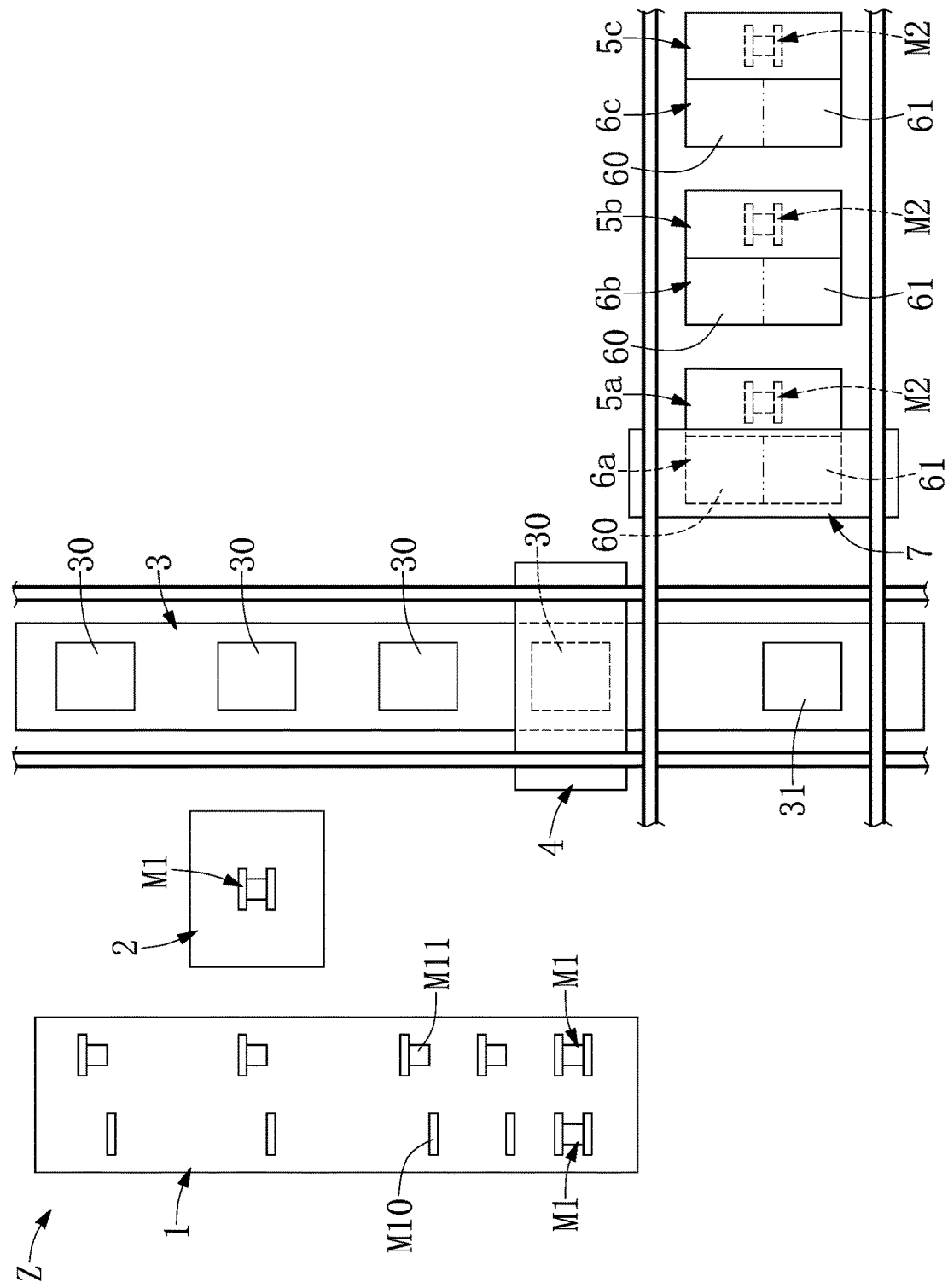
FIG. 3 is a first schematic diagram of step S100 of the intelligent automatic mold-exchanging method in operation according to the first embodiment of the present disclosure.
Figure 4:
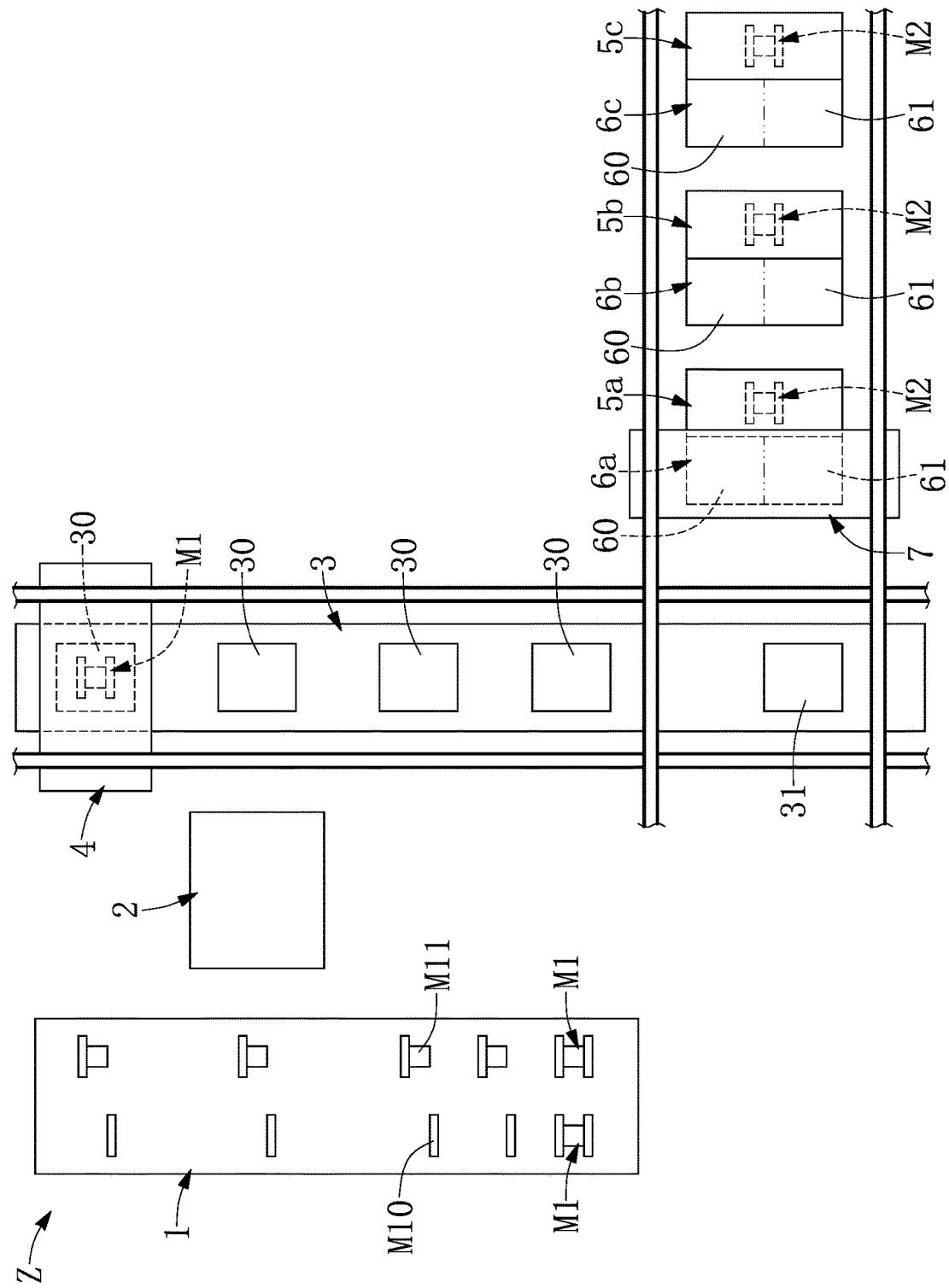
FIG. 4 is a second schematic diagram of step S100 of the intelligent automatic mold-exchanging method in operation according to the first embodiment of the present disclosure.

The intelligent automatic mold-exchanging method includes: transferring a reserve mold M1 to a mold temporary storage unit 3 (Step S100), e.g., as shown in FIG. 1, FIG. 3, and FIG. 4, the reserve mold M1 has been placed in a mold assembly and disassembly unit 2; transferring the reserve mold M1 to the mold temporary storage unit 3 by manpower or mechanical transportation.

Further, the mold temporary storage unit 3 includes a plurality of reserve mold temporary storage areas 30 and a preparatory pick-and-place area 31. The reserve mold M1 is placed in the reserve mold temporary storage areas 30 or the preparatory pick-and-place area 31, and the reserve mold M1 can be a die-casting mold, but the present disclosure is not limited thereto. For example, as shown in FIG. 1, FIG. 3, and FIG. 4, the mold temporary storage unit 3 of the present disclosure includes the reserve mold temporary storage areas 30 and the preparatory pick-and-place area 31. The reserve mold temporary storage areas 30 are adjacent to the mold assembly and disassembly unit 2. The preparatory pick-and-place area 31 is distant from the reserve mold temporary storage areas 30; wherein the mold temporary storage unit 3 can be a temporary storage line such as a general production line, but the present disclosure is not limited thereto. Therefore, before transferring the reserve mold M1 to the mold temporary storage unit 3, the reserve mold M1 can be placed in one of the reserve mold temporary storage areas 30. Next, the reserve mold M1 is transferred from one of the reserve mold temporary storage areas 30 to the preparatory pick-and-place area 31 by a temporary storage mold pick-and-place unit 4. The temporary storage mold pick-and-place unit 4 is movably disposed above the mold temporary storage unit 3. The temporary storage mold pick-and-place unit 4 can be a storage line crane, but the present disclosure is not limited thereto.

Further, before transferring the reserve mold M1 to the mold temporary storage unit 3, at least one reserve mold M1 is picked from a mold storage unit 1 and transferred to the mold assembly and disassembly unit 2. For example, as shown in FIG. 1, FIG. 3, and FIG. 4, the mold storage unit 1 of the present disclosure includes a plurality of reserve molds M1 disposed therein. The reserve mold M1 includes a first reserve mold M10 and a second reserve mold M11 that can be matched and assembled to each other. Hence, the assembled reserve mold M1 or the unassembled first reserve mold M10 and the second reserve mold M11 can be placed in the mold storage unit 1, wherein the mold storage unit 1 can be a mold storage room or a mold storage-room platform. The first reserve mold M10 can be a male mold and the second reserve mold M11 can be a female mold, but the present disclosure is not limited thereto. Next, the unassembled first reserve mold M10 and second reserve mold M11 are transferred to the mold assembly and disassembly unit 2 and assembled into the reserve mold M1 by mechanical or manual means at the mold assembly and disassembly unit 2. The mold assembly and disassembly unit 2 can be an automated-mechanical machine or a general workbench with assembly and disassembly function, but the present disclosure is not limited thereto.

Further, when the reserve mold M1 is not used, the first reserve mold M10 and the second reserve mold M11 of the reserve mold M1 are disassembled and then placed in the mold storage unit 1 separately. When the reserve mold M1 is ready to use, the first reserve mold M10 and the second reserve mold M11 of the reserve mold M1 are assembled by the mold assembly and disassembly unit 2 and then placed in the mold storage unit 1.

Figure 5:
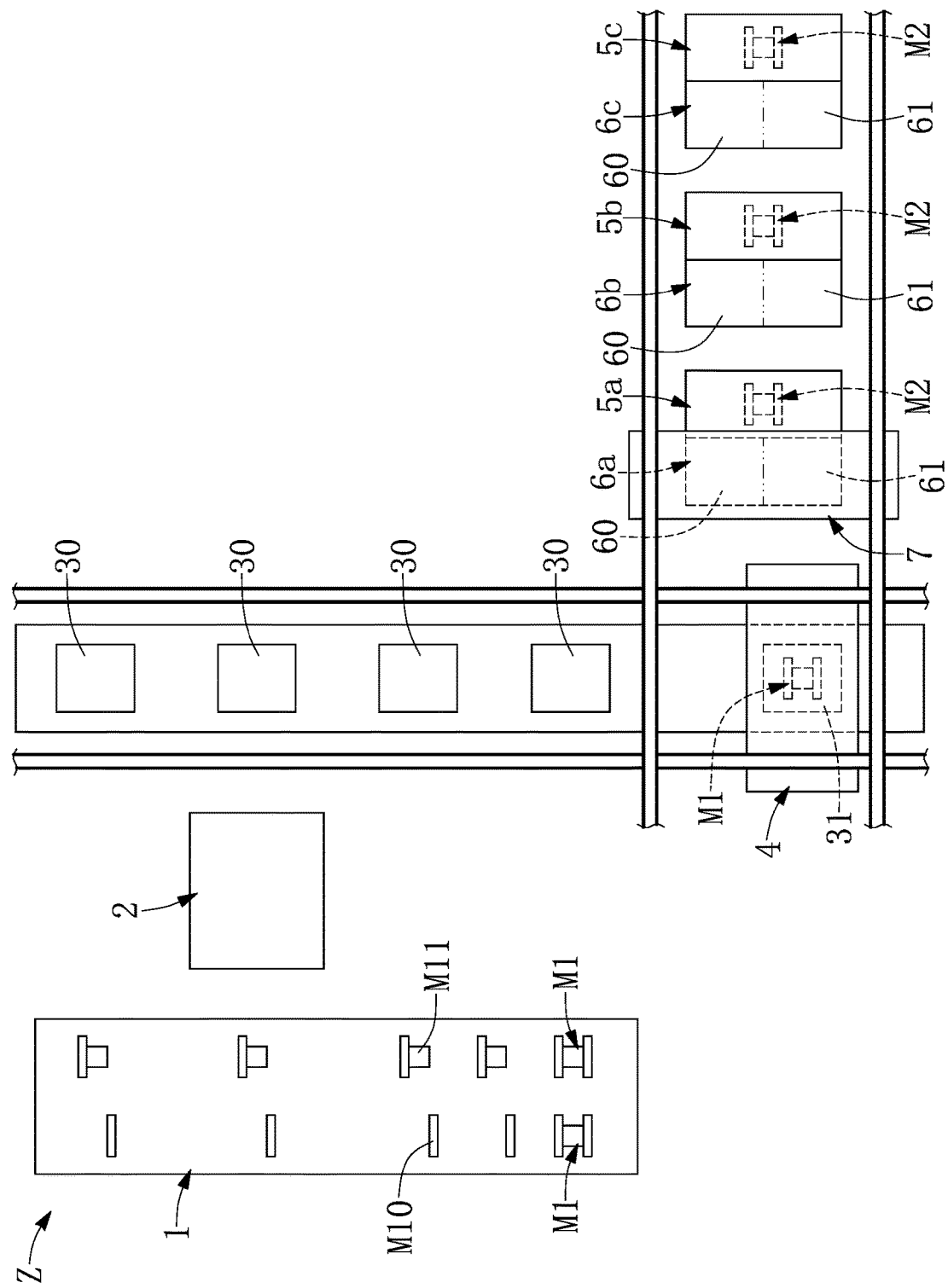
FIG. 5 is the first schematic diagram of step S102 of the intelligent automatic mold-exchanging method in operation according to the first embodiment of the present disclosure.
Figure 7:
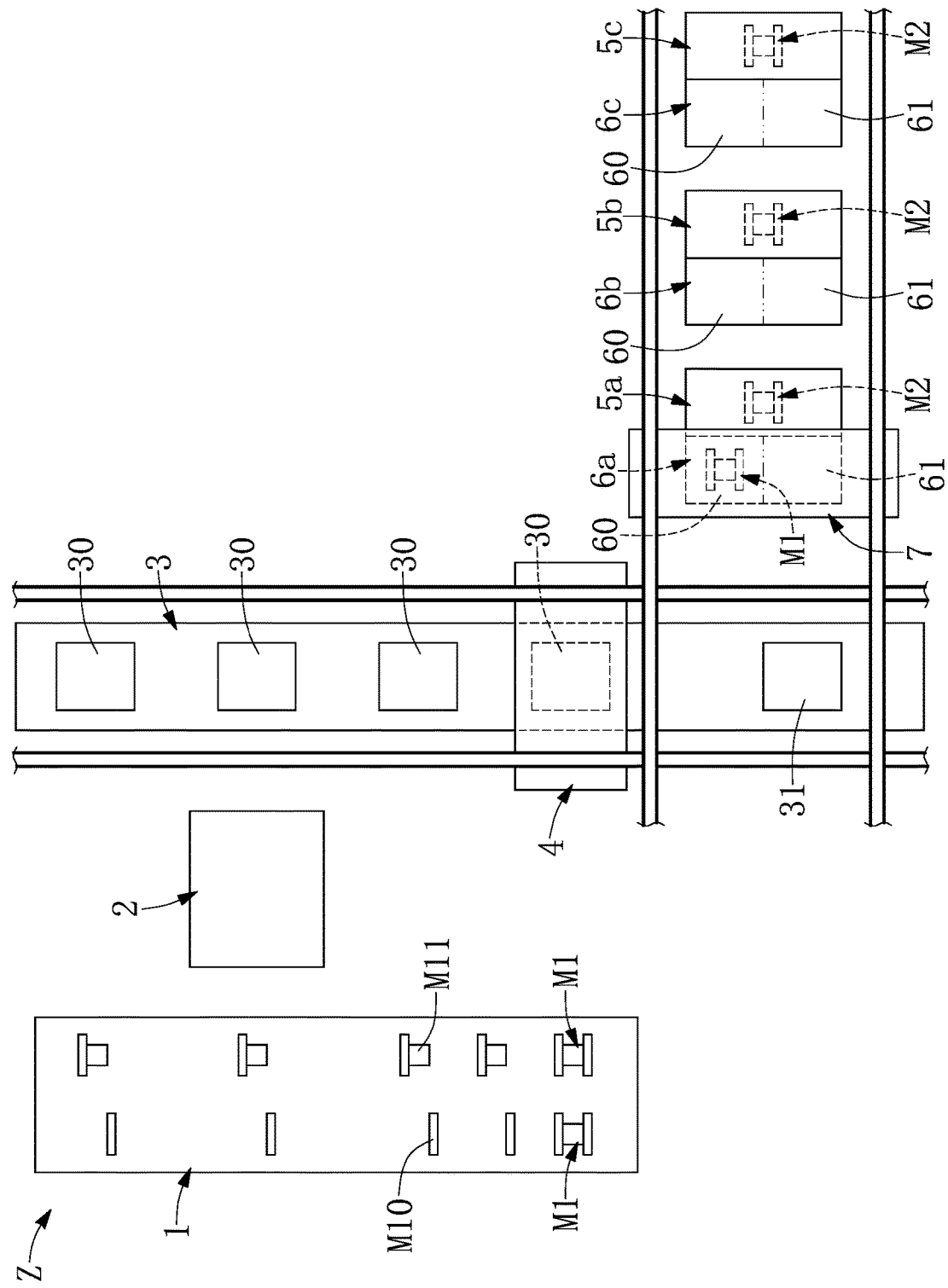
FIG. 7 is a third schematic diagram of step S102 of the intelligent automatic mold-exchanging method in operation according to the first embodiment of the present disclosure.

Next, by an exchange mold pick-and-place unit 7, the reserve mold M1 that has been placed in the mold temporary storage unit 3 is transferred to a mold position preparation unit (step S102). For example, as shown in FIG. 1, FIG. 5, and FIG. 7, the present disclosure can have a plurality of processing machines (5a, 5b, 5c). Each of the processing machines (5a, 5b, 5c) is set aside with mold position preparation units (6a, 6b, 6c); wherein the processing machines (5a, 5b, 5c) can be die-casting machines, and the mold position preparation units (6a, 6b, 6c) can be shelves, but the present disclosure is not limited thereto. Hence, when the reserve mold M1 has been placed in a preparatory pick-and-place area 31 of the mold temporary storage unit 3, the reserve mold M1 that has been placed in a preparatory pick-and-place area 31 is transferred to one of the mold position preparation units (6a, 6b, 6c) by the exchange mold pick-and-place unit 7 to prepare to proceed with subsequent process operations. The exchange mold pick-and-place unit 7 can be movably disposed above the processing machines (5a, 5b, 5c) and the mold position preparation units (6a, 6b, 6c), and the exchange mold pick-and-place unit 7 can be an automatic mold-repairing line such as a mold-exchanging crane, but the present disclosure is not limited thereto. Moreover, the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7 can be disposed on a same production line.

Figure 6:
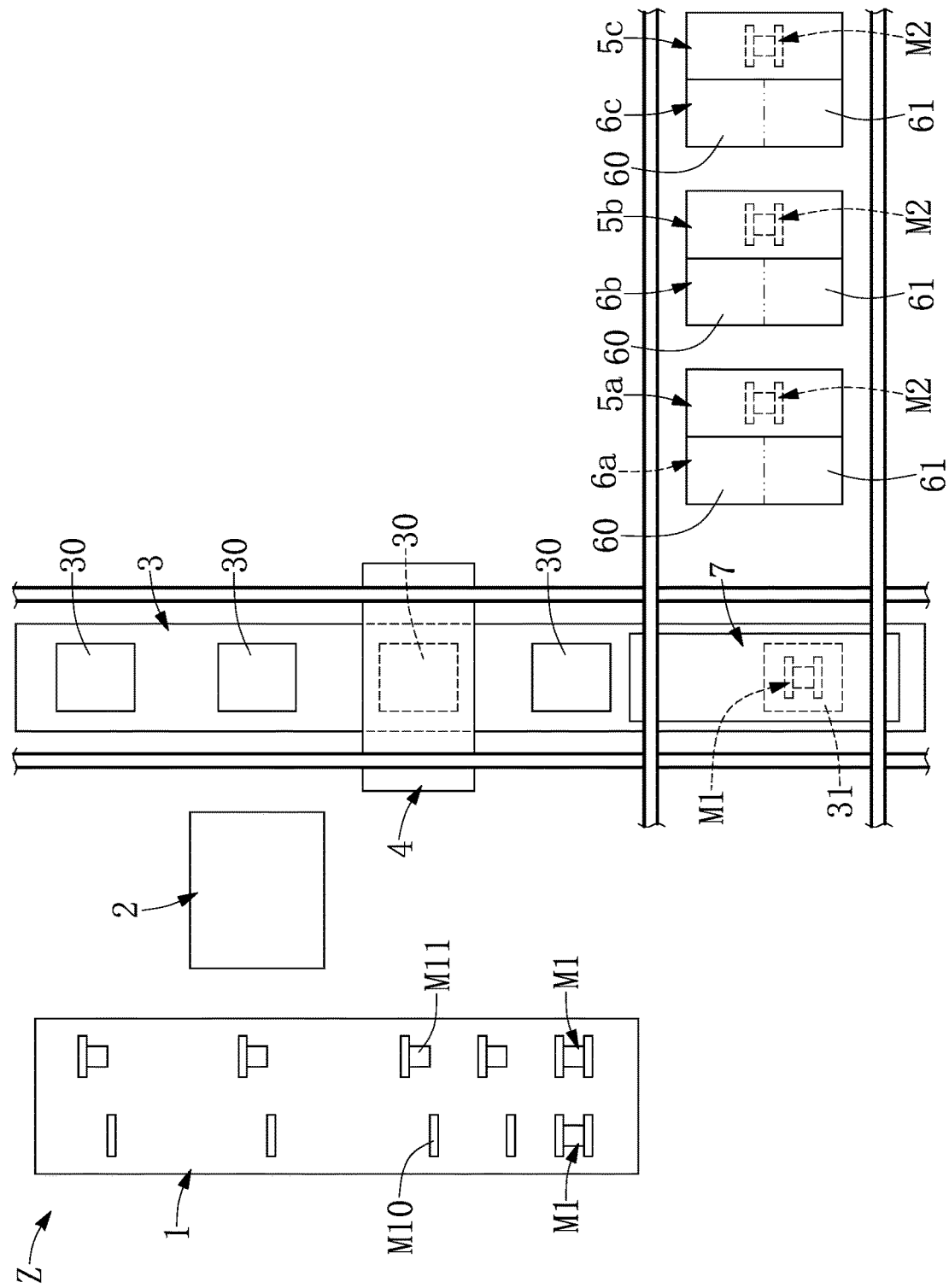
FIG. 6 is the second schematic diagram of step S102 of the intelligent automatic mold-exchanging method in operation according to the first embodiment of the present disclosure.

Further, each of the mold position preparation units (6a, 6b, 6c) includes a first mold position preparation unit 60 and a second mold position preparation unit 61, and the reserve mold M1 is transferred from the preparatory pick-and-place area 31 to the first mold position preparation unit 60 of the mold position preparation units (6a, 6b, 6c) by the exchange mold pick-and-place unit 7. For example, as shown in FIGS. 5 to 7, the first mold position preparation unit 60 of the mold position preparation units (6a, 6b, 6c) can be used to place molds for replacement, and the second mold position preparation unit 61 of the mold position preparation units (6a, 6b, 6c) can be used to place the molds that have been replaced. Hence, by the exchange mold pick-and-place unit 7, the reserve mold M1 of the preparatory pick-and-place area 31 is transferred to the first mold position preparation unit 60 of one of the mold position preparation units (6a, 6b, 6c).

Figure 8:
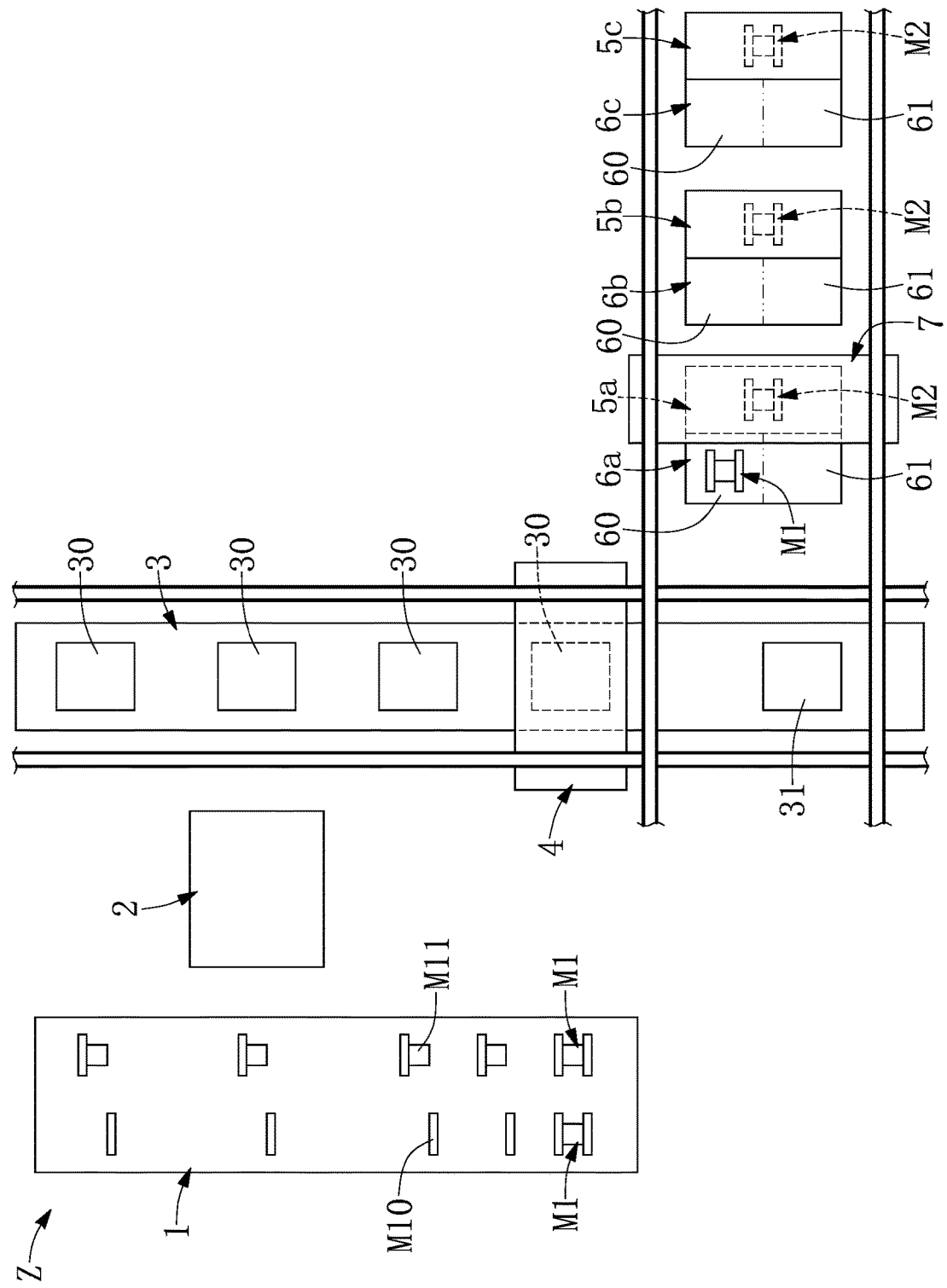
FIG. 8 is the first schematic diagram of step S104 of the intelligent automatic mold-exchanging method in operation according to the first embodiment of the present disclosure.
Figure 9:
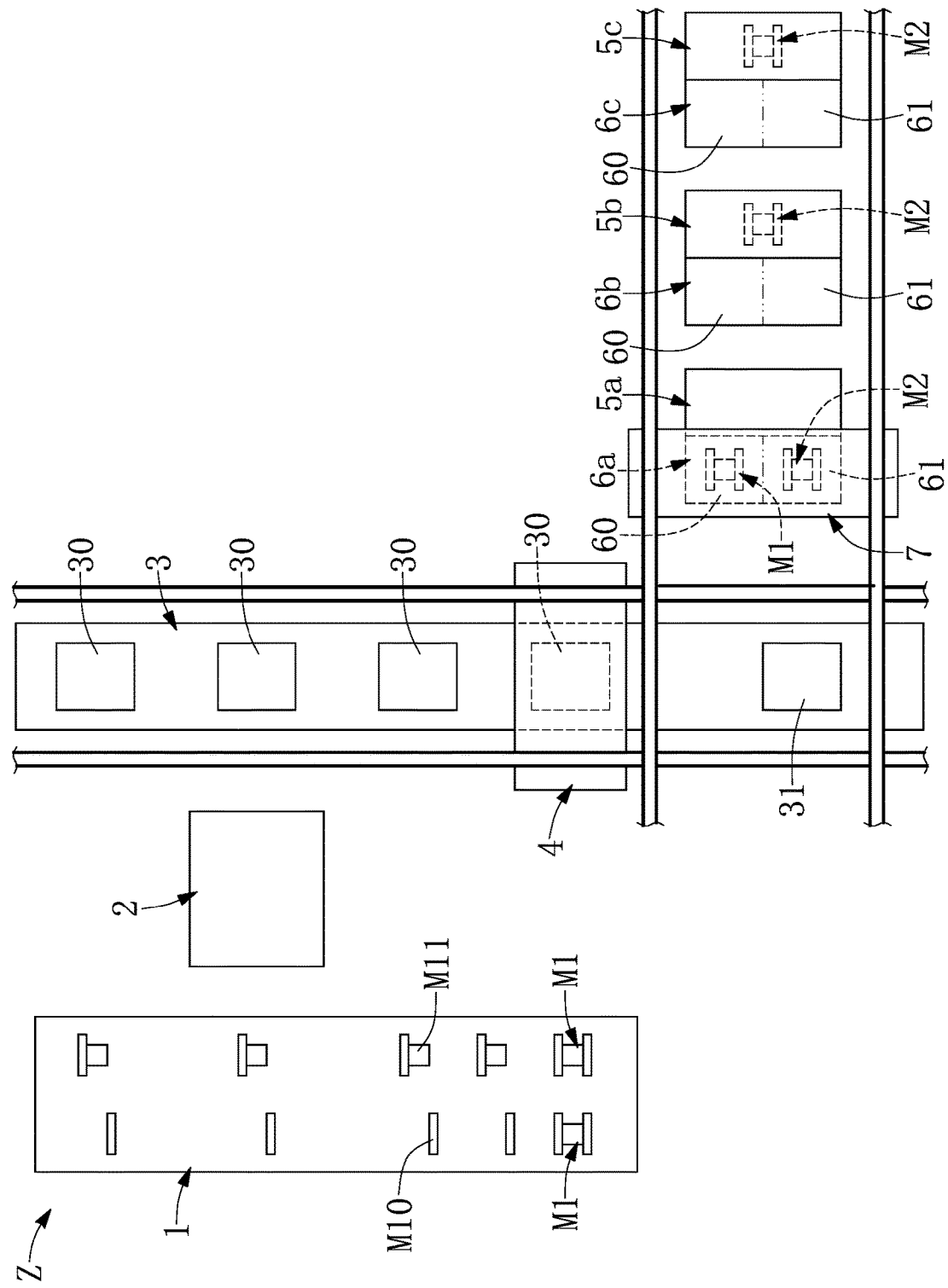
FIG. 9 is the second schematic diagram of step S104 of the intelligent automatic mold-exchanging method in operation according to the first embodiment of the present disclosure.

Next, by the exchange mold pick-and-place unit 7, a raw processing mold M2 that has been disposed in the processing machine 5a is picked out and placed in the mold position preparation unit 6a (Step S104). For example, as shown in FIG. 8 and FIG. 9, each of the processing machines 5a, 5b, 5c includes a raw processing mold M2. Hence, after the reserve mold M1 has been placed in the first mold position preparation unit 60, the raw processing mold M2 can be picked out from the processing machine 5a and then placed in the second mold position preparation unit 61 by the exchange mold pick-and-place unit 7.

Figure 10:
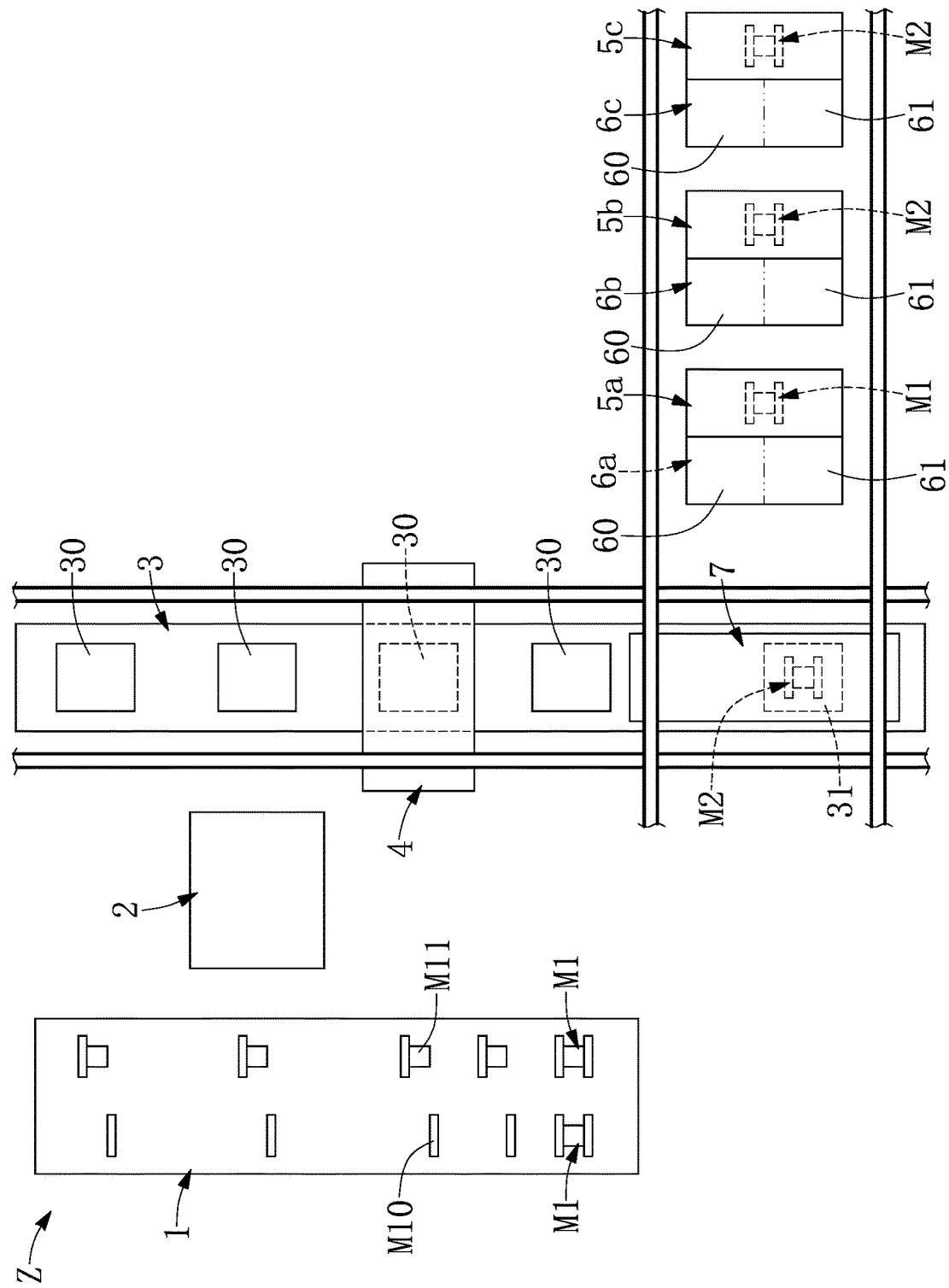
FIG. 10 is a schematic diagram of step S106 of the intelligent automatic mold-exchanging method according to the first embodiment of the present disclosure.

Next, by the exchange mold pick-and-place unit 7, the reserve mold M1 disposed in the mold position preparation unit is placed in the processing machine (Step S106). For example, as shown in FIGS. 8 and 10, after the raw processing mold M2 disposed in the processing machines 5a is picked out and placed in the second mold position preparation unit 61 by the exchange mold pick-and-place unit 7, the reserve mold M1 that has been placed in the first mold position preparation unit 60 is placed in the processing machines 5a by the exchange mold pick-and-place unit 7. The raw processing mold M2 can be a die-casting mold, but the present disclosure is not limited thereto.

Next, by the exchange mold pick-and-place unit 7, the raw processing mold M2 placed in the mold position preparation unit is transferred to the mold temporary storage unit 3 (Step S108). For example, as shown in FIG. 5, FIG. 6, and FIG. 10, the raw processing mold M2 that has been placed in the second mold position preparation unit 61 is transferred to the preparatory pick-and-place area 31 of the mold temporary storage unit 3 by the exchange mold pick-and-place unit 7.

Further, after the raw processing mold M2 has been placed in the preparatory pick-and-place area 31, the raw processing mold M2 is transferred to one of the reserve mold temporary storage areas 30 by a temporary storage mold pick-and-place unit 4. The raw processing mold M2 therefore can be transferred to be disassembled in the mold assembly and disassembly unit 2 more easily.

Figure 2:
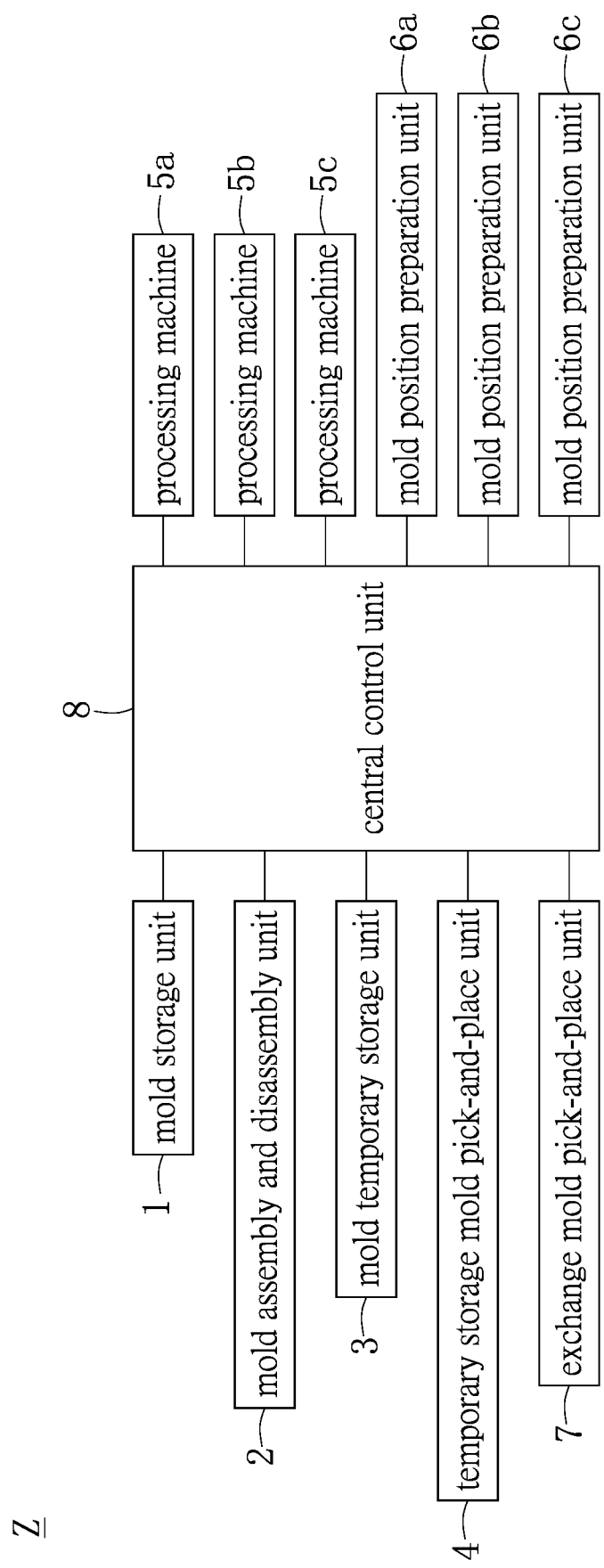
FIG. 2 is a functional-block diagram of an intelligent automatic mold-exchanging system according to the first embodiment of the present disclosure.

Furthermore, as shown in FIGS. 2 and 10, the present disclosure also has a central control unit 8 which is electrically connected to the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7. For example, as shown in FIG. 5, the central control unit 8 can be terminal control equipment, but the present disclosure is not limited thereto. The central control unit 8 can proceed according to a user's operations to control at least one of the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7.

Further, the mold storage unit 1, the mold assembly and disassembly unit 2, the reserve mold temporary storage areas 30 and the preparatory pick-and-place area 31 of the mold temporary storage unit 3, the temporary storage mold pick-and-place unit 4, the processing machines (5a, 5b, 5c), the first mold position preparation unit 60 and the second mold position preparation unit 61 of the mold position preparation units (6a, 6b, 6c), and the exchange mold pick-and-place unit 7 can be set up with sensors (not shown in the figures), and the central control unit 8 is in wire or wireless communication with the sensors. Hence, the central control unit 8 can instantaneously obtain a working status of every unit by receiving signals sent by each sensor for the user to refer to or control.

According to the above description, the present disclosure further provides an intelligent automatic mold-exchanging system Z which includes the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), the exchange mold pick-and-place unit 7, and the central control unit 8. The mold storage unit 1 includes the plurality of reserve molds M1 disposed therein. The mold assembly and disassembly unit 2 is adjacent to the mold storage unit 1. The mold temporary storage unit 3 is adjacent to the mold assembly and disassembly unit 2. The temporary storage mold pick-and-place unit 4 is movably disposed above the mold temporary storage unit 3. The processing machines (5a, 5b, 5c) are adjacent to the mold temporary storage unit 3, and each processing machine (5a, 5b, 5c) includes a raw processing mold M2. The mold position preparation units (6a, 6b, 6c) are respectively disposed beside the processing machines (5a, 5b, 5c). The exchange mold pick-and-place unit 7 is movably disposed above the processing machines (5a, 5b, 5c) and the mold position preparation units (6a, 6b, 6c). The central control unit 8 is electrically connected to the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7. Wherein the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7 are disposed on the same production line.

Figure 11:
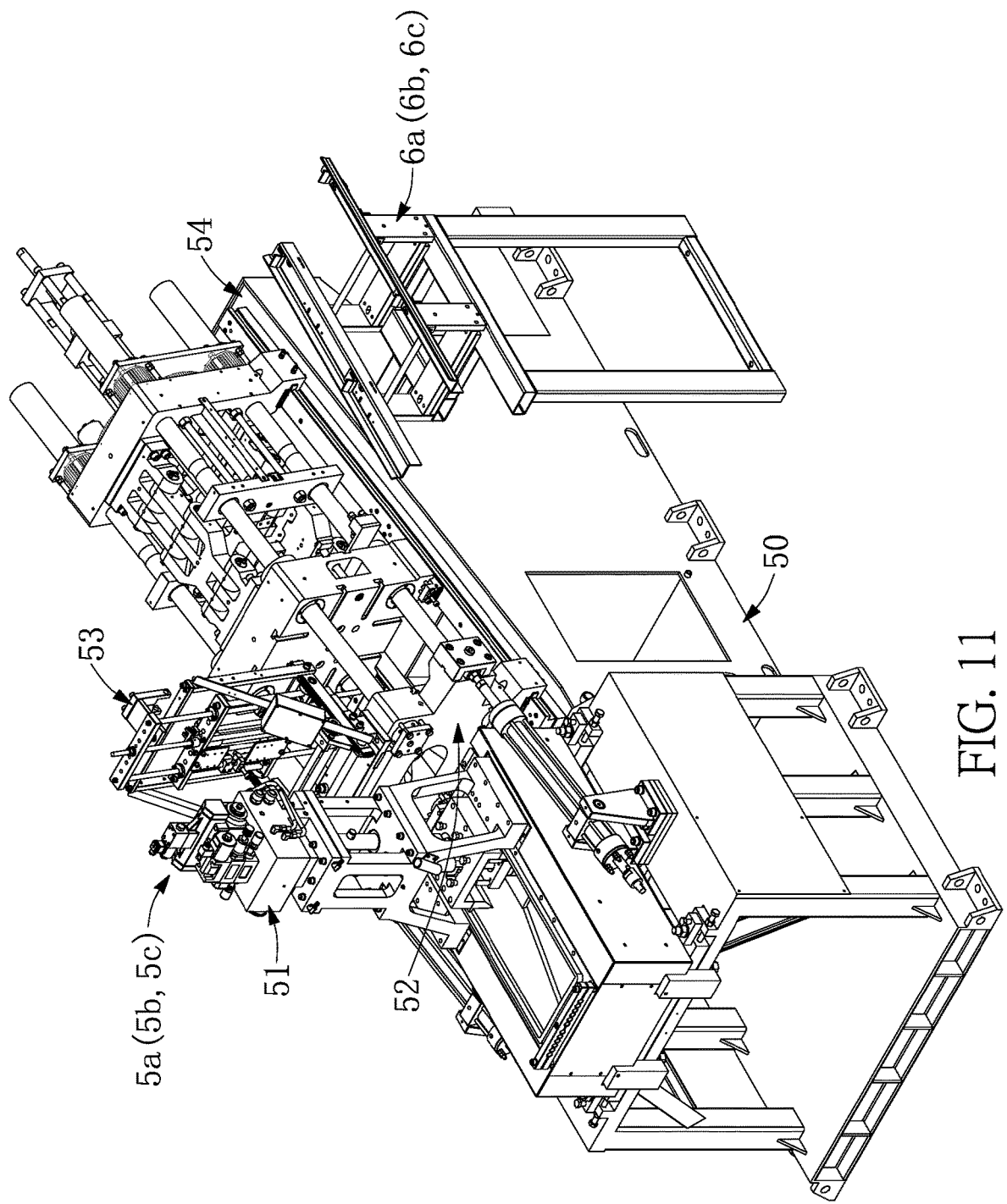
FIG. 11 is a schematic perspective diagram of a processing machine and a mold position preparation unit according to the first embodiment of the present disclosure.
Figure 12:
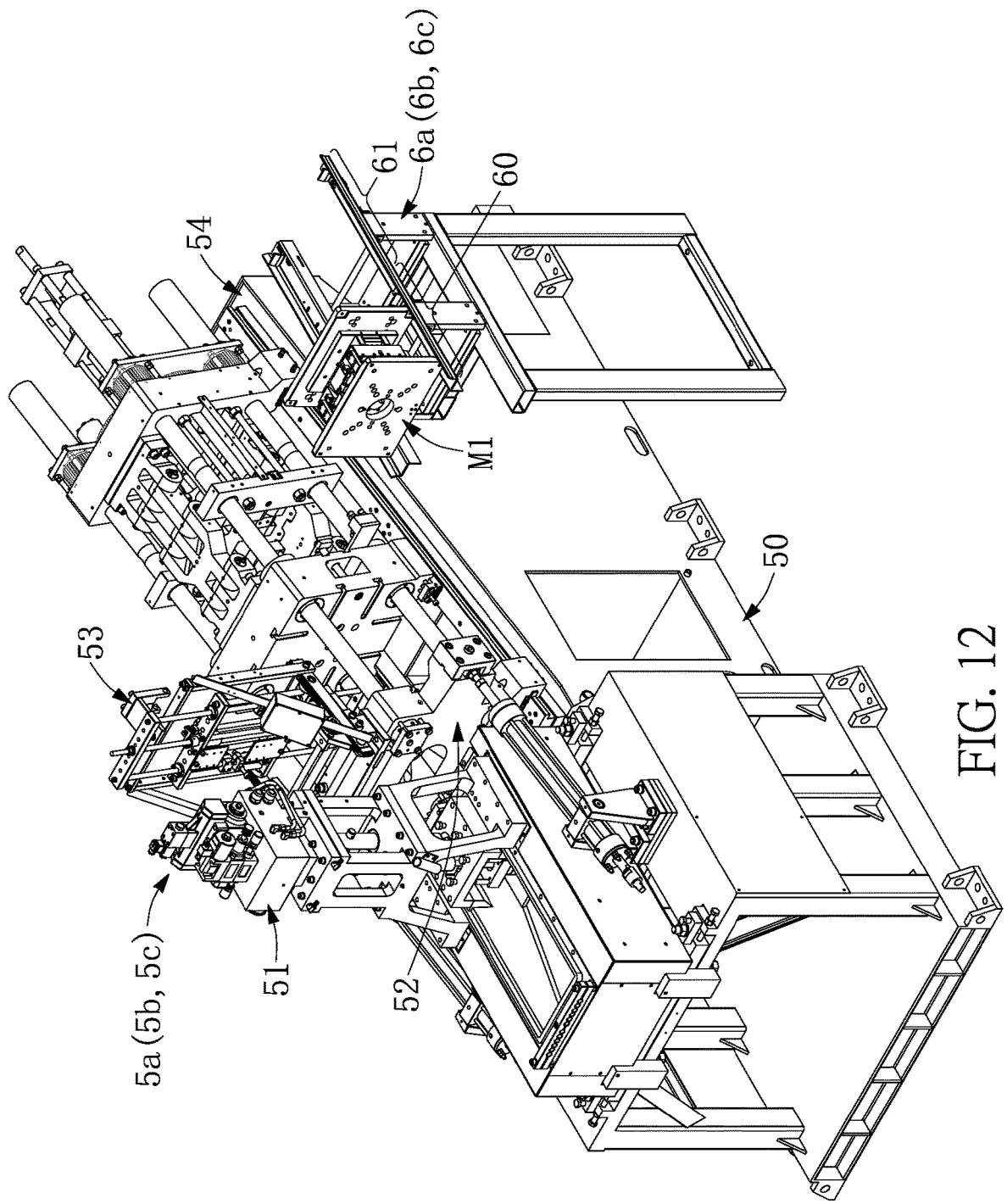
FIG. 12 is a schematic perspective diagram according to the first embodiment of the present disclosure.

Furthermore, as shown in FIG. 11 and FIG. 12, each of the processing machines (5a, 5b, 5c) of the present disclosure includes a base module 50, a feed module 51, a die-fixing module 52, a detection module 53, and a conveyor module 54. The feed module 51 is disposed on the base module 50. The die-fixing module 52 is disposed on the base module 50 and connected to the feed module 51. The detection module 53 is connected to the die-fixing module 52. The conveyor module 54 is on the base module 50 and adjacent to the die-fixing module 52. Hence, the reserve mold M1 (or the raw processing mold M2) can be transferred to the die-fixing module 52 by the exchange mold pick-and-place unit 7 The reserve mold M1 can be detachably fixed on the die-fixing module 52, and then a nozzle of the feed module 51 (not shown in the figures) injects a molding material into the reserve mold M1 through the die-fixing module 52. Next, through the die-fixing module 52, the reserve mold M1 is separated to make finished or half-finished products which are in the reserve mold M1 to fall on the conveyor module 54, and then be transferred to other places by the conveyor module 54. When the reserve mold M1 is in an open-die status, the detection module 53 can detect whether the finished or half-finished products are detached from the reserve mold M1. When the finished or half-finished products are still on the reserve mold M1, the detection module 53 can alert the operator by generating a warning signal or a warning message (e.g., sound and light).

Moreover, each of the mold position preparation units (6a, 6b, 6c) is correspondingly disposed beside the processing machines (5a, 5b, 5c). As shown in FIG. 11 and FIG. 12, the mold position preparation units (6a, 6b, 6c) can be a workbench or a work shelf, but the present disclosure is not limited thereto. Each of the mold position preparation units (6a, 6b, 6c) has a first mold position preparation unit 60 and a second mold position preparation unit 61 for placing the reserve mold M1 and the raw processing mold M2.

Second Embodiment

Figure 13:
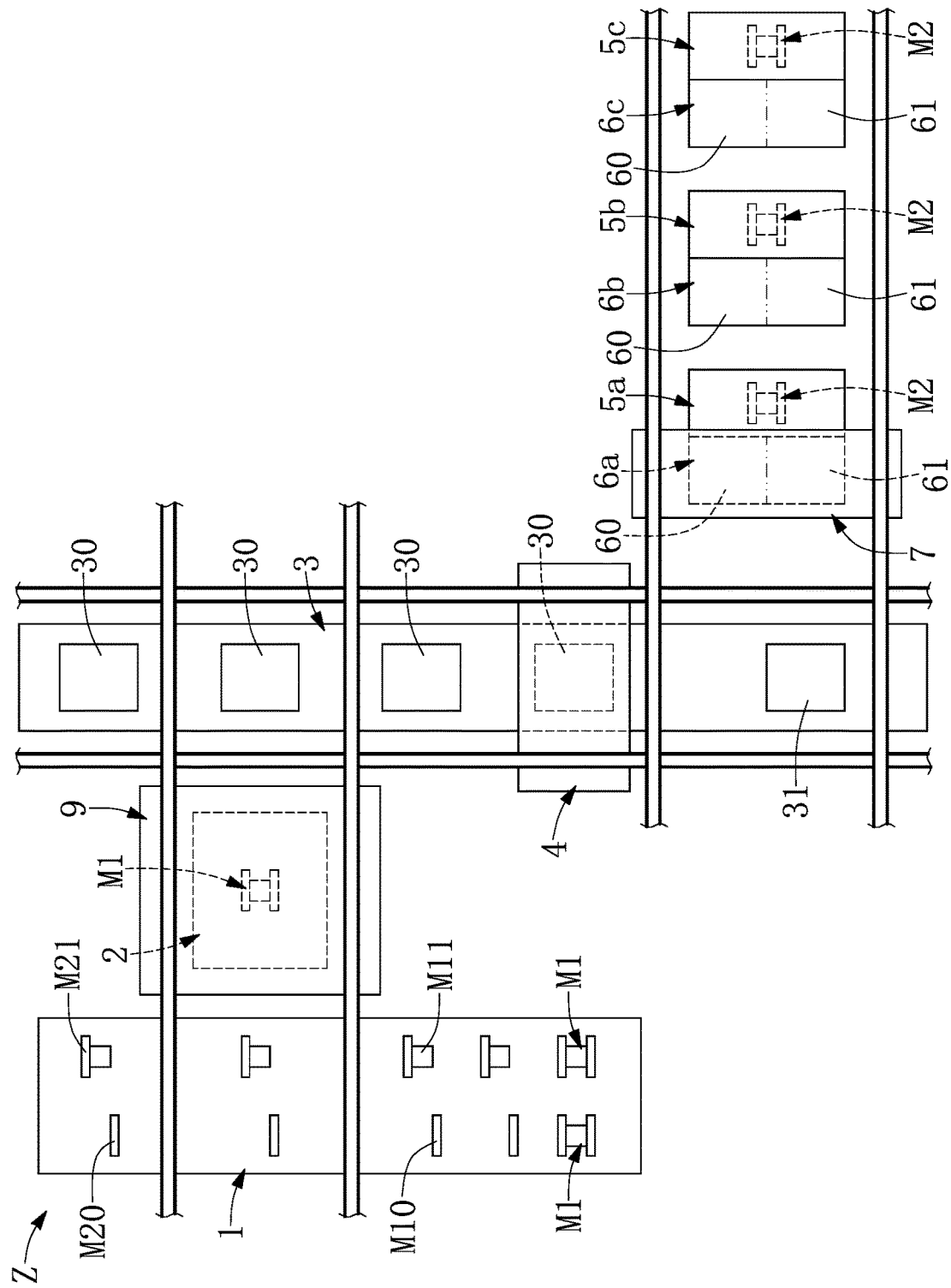
FIG. 13 is a schematic diagram of the intelligent automatic mold-exchanging system according to the second embodiment of the present disclosure.
Figure 14:
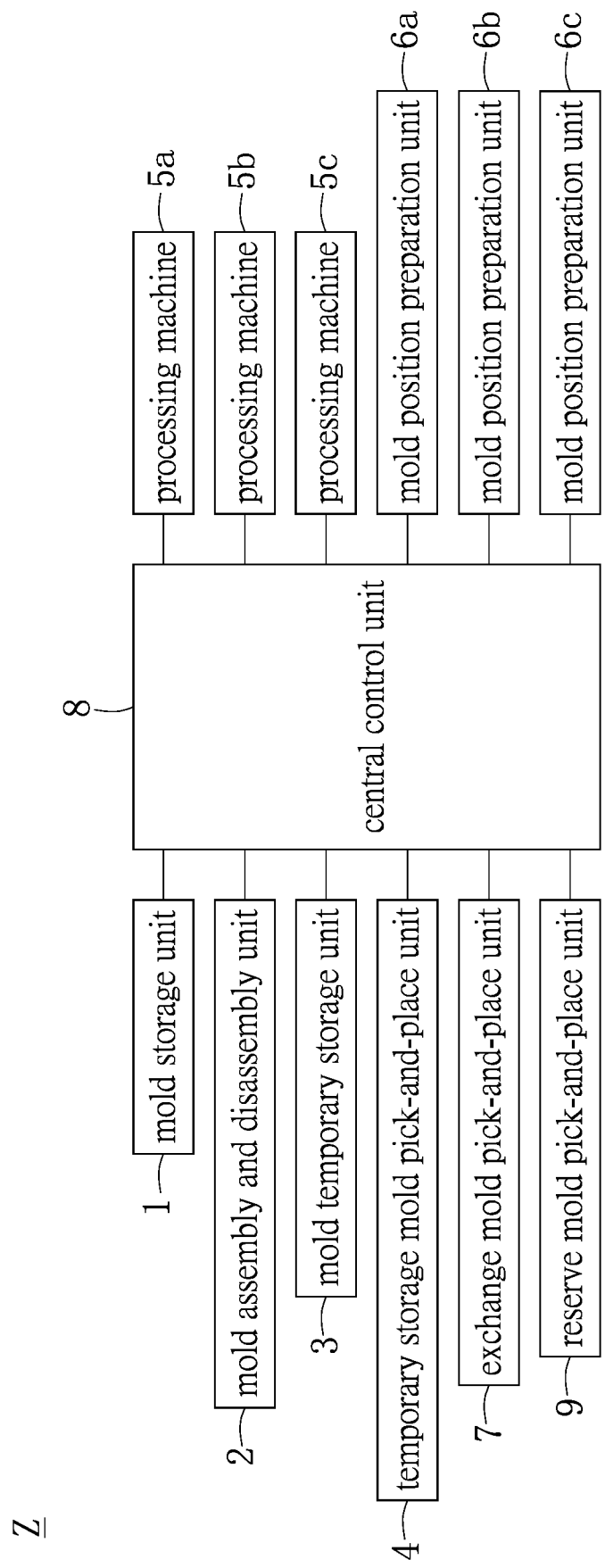
FIG. 14 is a functional-block diagram of the intelligent automatic mold-exchanging system according to the second embodiment of the present disclosure.

Referring to FIG. 13 and FIG. 14, a second embodiment of the present disclosure provides an intelligent automatic mold-exchanging system Z which includes a mold storage unit 1, a mold assembly and disassembly unit 2, a mold temporary storage unit 3, a temporary storage mold pick-and-place unit 4, a plurality of processing machines (5a, 5b, 5c), a plurality of mold position preparation units (6a, 6b, 6c), an exchange mold pick-and-place unit 7, a central control unit 8 and a reserve mold pick-and-place unit 9. As shown by comparing FIG. 13 and FIG. 14 to FIG. 3 and FIG. 2, the biggest difference between the first and second embodiment is: the intelligent automatic mold-exchanging system Z further includes the reserve mold pick-and-place unit 9 which can be movably disposed above the mold storage unit 1 and the mold assembly and disassembly unit 2, wherein the reserve mold pick-and-place unit 9 can be a mold-transporting crane, but the present disclosure is not limited thereto.

For example, as shown in FIG. 13 and FIG. 14, when the first reserve mold M10 and the second reserve mold M11 are disassembled by the mold assembly and disassembly unit 2, the first reserve mold M10 and the second reserve mold M11 are then transferred to the mold storage unit 1 by the reserve mold pick-and-place unit 9. On the contrary, when the first reserve mold M10 and the second reserve mold M11 are assembled by the mold assembly and disassembly unit 2, the first reserve mold M10 and the second reserve mold M11 are then transferred to the mold temporary storage unit 3 by the reserve mold pick-and-place unit 9.

Further, as shown in FIG. 13 and FIG. 14, the raw processing mold M2 that has been placed in the reserve mold temporary storage area 30 can also be transferred to the mold assembly and disassembly unit 2 by the reserve mold pick-and-place unit 9. Moreover, the raw processing mold M2 is disassembled into at least a first mold M20 and a second mold M21 by the mold assembly and disassembly unit 2. The first mold M20 and the second mold M21 can also be transferred to the mold storage unit 1 by the reserve mold pick-and-place unit 9, wherein the first mold M20 can be a male mold and the second mold M21 can be a female mold, but the present disclosure is not limited thereto.

One of the beneficial effects of the present disclosure is that the intelligent automatic mold-exchanging system can improve an efficiency of a transporting process and reduce a time of the process by the technical features of "the mold storage unit 1 including the reserve molds M1 disposed therein", "the mold assembly and disassembly unit 2 being adjacent to the mold storage unit 1", "the mold temporary storage unit 3 being adjacent to the mold assembly and disassembly unit 2", "the temporary storage mold pick-and-place unit 4 being movably disposed above the mold temporary storage unit 3", "the processing machines 5a, 5b, 5c being adjacent to the mold temporary storage unit 3, wherein each processing machine (5a, 5b, 5c) includes a raw processing mold M2", "the mold position preparation units (6a, 6b, 6c) respectively disposed beside the processing machines (5a, 5b, 5c)", "the exchange mold pick-and-place unit 7 being movably disposed above the processing machines (5a, 5b, 5c) and the mold position preparation units (6a, 6b, 6c)", "the central control unit 8 being electrically connected to the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7", and "the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7 disposed on the same production line".

Another beneficial effect of the present disclosure is that the intelligent automatic mold-exchanging method can improve an efficiency of a mold-exchanging process and reduce a time of the process by the technical solutions of "transferring a reserve mold M1 to a mold temporary storage unit 3", "transferring the reserve mold M1 that has been placed in the mold temporary storage unit 3 to a mold position preparation unit by an exchange mold pick-and-place unit 7", "picking out a raw processing mold M2 disposed in the processing machine 5a, 5b, 5c, and placing the raw processing mold M2 in the mold position preparation unit by the exchange mold pick-and-place unit 7", "placing the reserve mold M1 that has been disposed in the mold position preparation unit in the processing machine by the exchange mold pick-and-place unit 7", and "transferring the raw processing mold M2 that has been placed in the mold position preparation units 6a, 6b, 6c to the mold temporary storage unit 3 by the exchange mold pick-and-place unit 7".

The present disclosure provides the intelligent automatic mold-exchanging system Z and the method thereof. Furthermore, through the above-mentioned technical features and solutions, the mold storage unit 1, the mold assembly and disassembly unit 2, the mold temporary storage unit 3, the temporary storage mold pick-and-place unit 4, the processing machines (5a, 5b, 5c), the mold position preparation units (6a, 6b, 6c), and the exchange mold pick-and-place unit 7 are disposed on the same production line. With a cooperation of "the temporary storage mold pick-and-place unit 4" and "the exchange mold pick-and-place unit 7", a problem of using manpower for transportation is resolved and a labor cost is reduced. Moreover, through setting the mold position preparation units (6a, 6b, 6c), a mold-exchanging time can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An intelligent automatic mold-exchanging method, comprising:

transferring a reserve mold to a mold temporary storage unit;

transferring the reserve mold that has been placed in the mold temporary storage unit to a mold position preparation unit by an exchange mold pick-and-place unit, wherein the mold position preparation unit is disposed beside a processing machine;

picking out a raw processing mold disposed in the processing machine, and placing the raw processing mold in the mold position preparation unit by the exchange mold pick-and-place unit;

placing the reserve mold that has been disposed in the mold position preparation unit in the processing machine by the exchange mold pick-and-place unit; and transferring the raw processing mold that has been placed in the mold position preparation unit to the mold temporary storage unit by the exchange mold pick-and-place unit;

wherein the mold position preparation unit includes a first mold preparation area and a second mold preparation area connected with each other in parallel and fixedly connected to the processing machine in parallel, and the reserve mold are transferred from the preparatory pick-and-place area to the first mold preparation area of the mold position preparation unit by the exchange mold pick-and-place unit;

wherein, after the raw processing mold disposed in the processing machine is picked out and placed in the second mold preparation area by the exchange mold pick-and-place unit, the reserve mold disposed in the first mold preparation area is placed in the processing machine by the exchange mold pick-and-place unit.

2. The intelligent automatic mold-exchanging method according to claim 1, wherein the reserve mold includes a first reserve mold and a second reserve mold matched and assembled to each other.

3. The intelligent automatic mold-exchanging method according to claim 2, wherein the first reserve mold and the second reserve mold that have been disassembled by a mold assembly and disassembly unit are transferred to a mold storage unit by a reserve mold pick-and-place unit.

4. The intelligent automatic mold-exchanging method according to claim 3, wherein the first reserve mold and the second reserve mold that have been assembled by the mold assembly and disassembly unit are transferred to the mold temporary storage unit by the reserve mold pick-and-place unit.

5. The intelligent automatic mold-exchanging method according to claim 4, wherein the mold temporary storage unit includes a plurality of reserve mold temporary storage areas and a preparatory pick-and-place area, and the reserve mold is placed in the reserve mold temporary storage areas or the preparatory pick-and-place area.

6. The intelligent automatic mold-exchanging method according to claim 5, wherein, when the reserve mold is placed in the preparatory pick-and-place area, the reserve mold is transferred from the preparatory pick-and-place area to the mold position preparation unit by the exchange mold pick-and-place unit.

7. The intelligent automatic mold-exchanging method according to claim 6, wherein the raw processing mold placed in the second mold preparation area is transferred to the preparatory pick-and-place area by the exchange mold pick-and-place unit.

8. The intelligent automatic mold-exchanging method according to claim 7, wherein the raw processing mold placed in the preparatory pick-and-place area is transferred to the reserve mold temporary storage area by a temporary storage mold pick-and-place unit.

9. The intelligent automatic mold-exchanging method according to claim 8, wherein the raw processing mold placed in the reserve mold temporary storage area is transferred to the mold assembly and disassembly unit by the reserve mold pick-and-place unit.

10. The intelligent automatic mold-exchanging method according to claim 9, wherein the raw processing mold is disassembled into at least a first mold and a second mold by the mold assembly and disassembly unit, and the first mold and the second mold are transferred to the mold storage unit by the reserve mold pick-and-place unit.

\* \* \* \* \*